Jan. 19, 1937.  C. L. HOFF  2,068,234
MACHINE AND METHOD FOR MAKING PRETZELS
Filed April 4, 1933  7 Sheets-Sheet 1
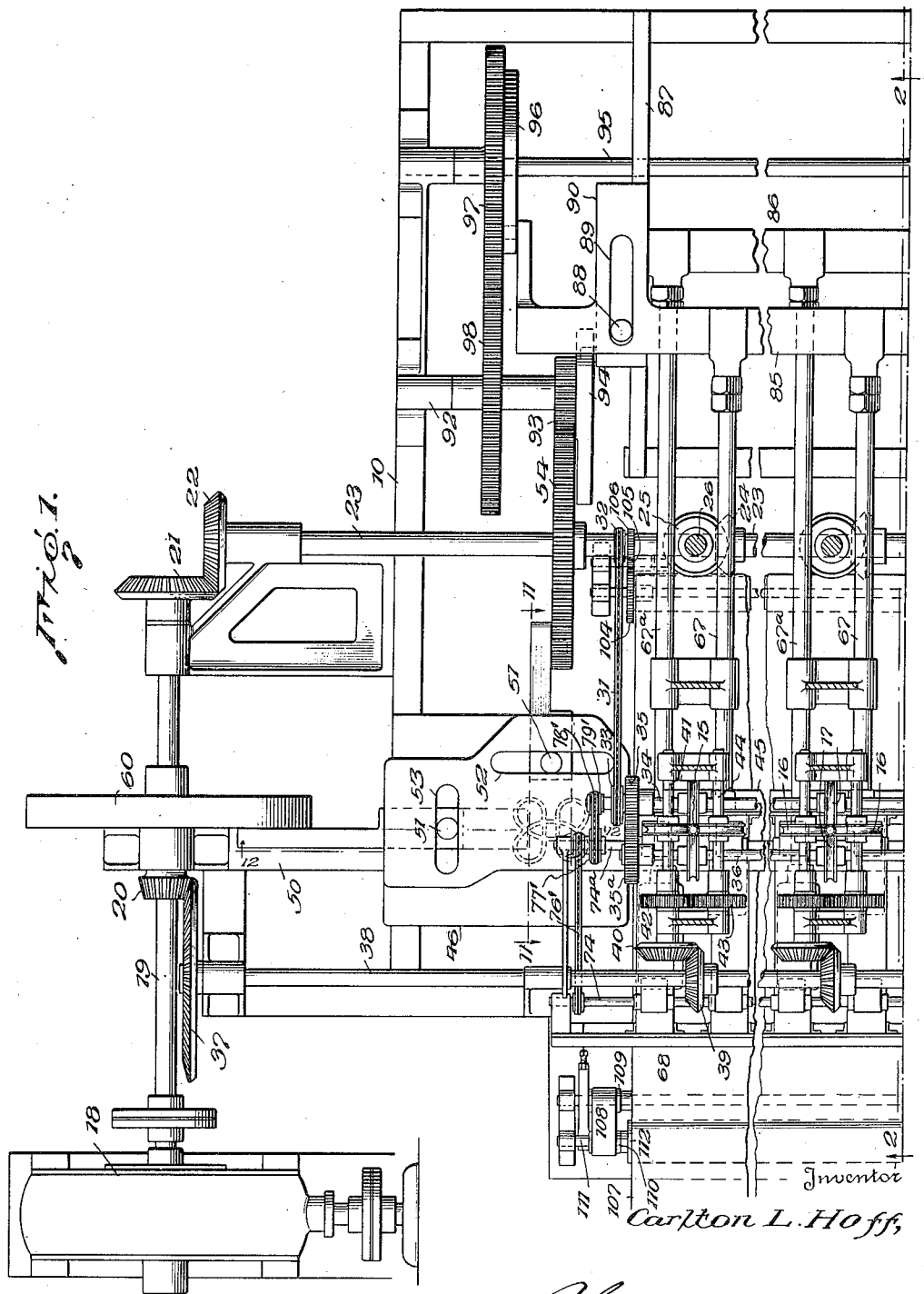
Inventor
Carlton L. Hoff,
By [signature]
His Attorneys

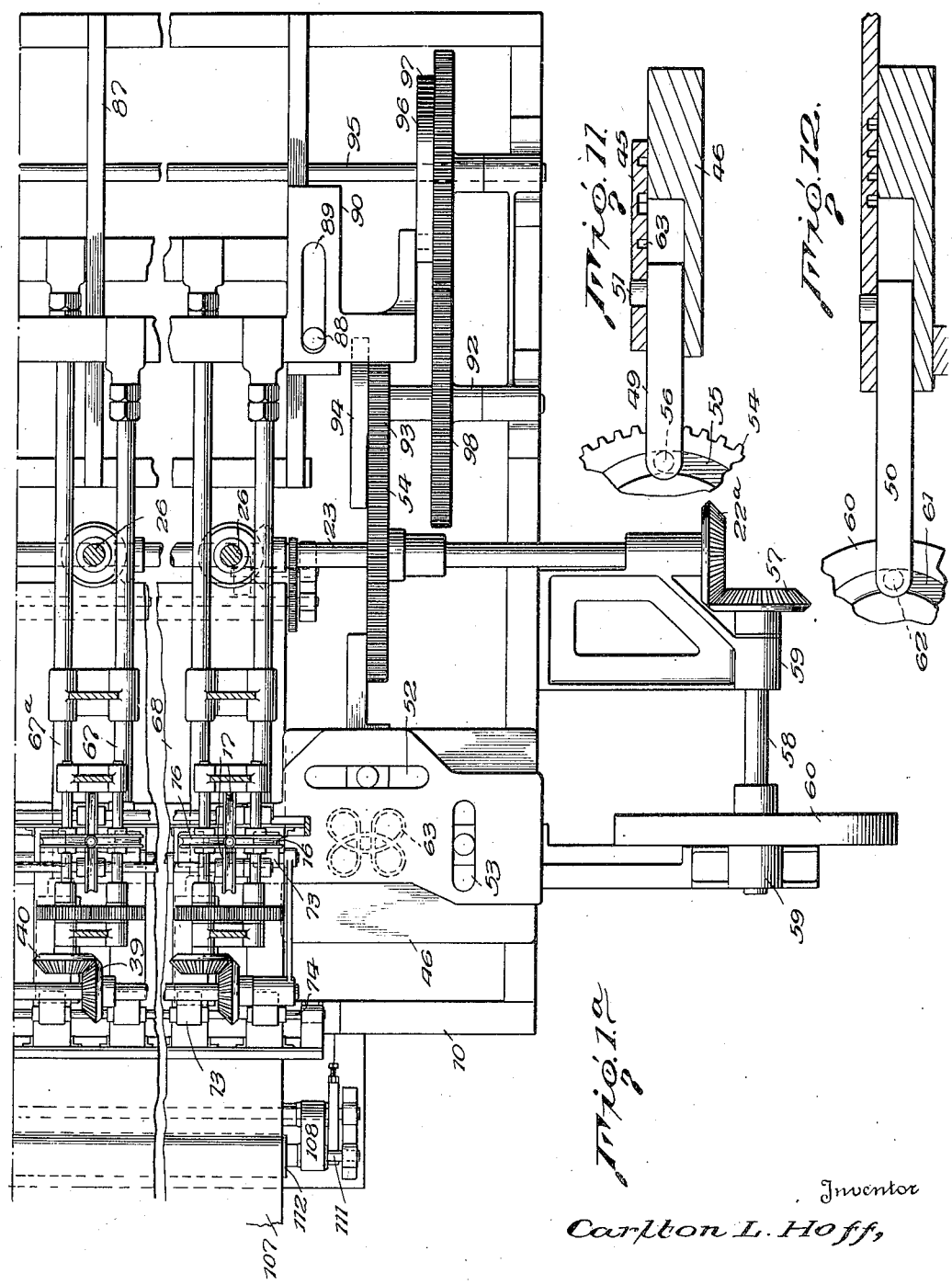

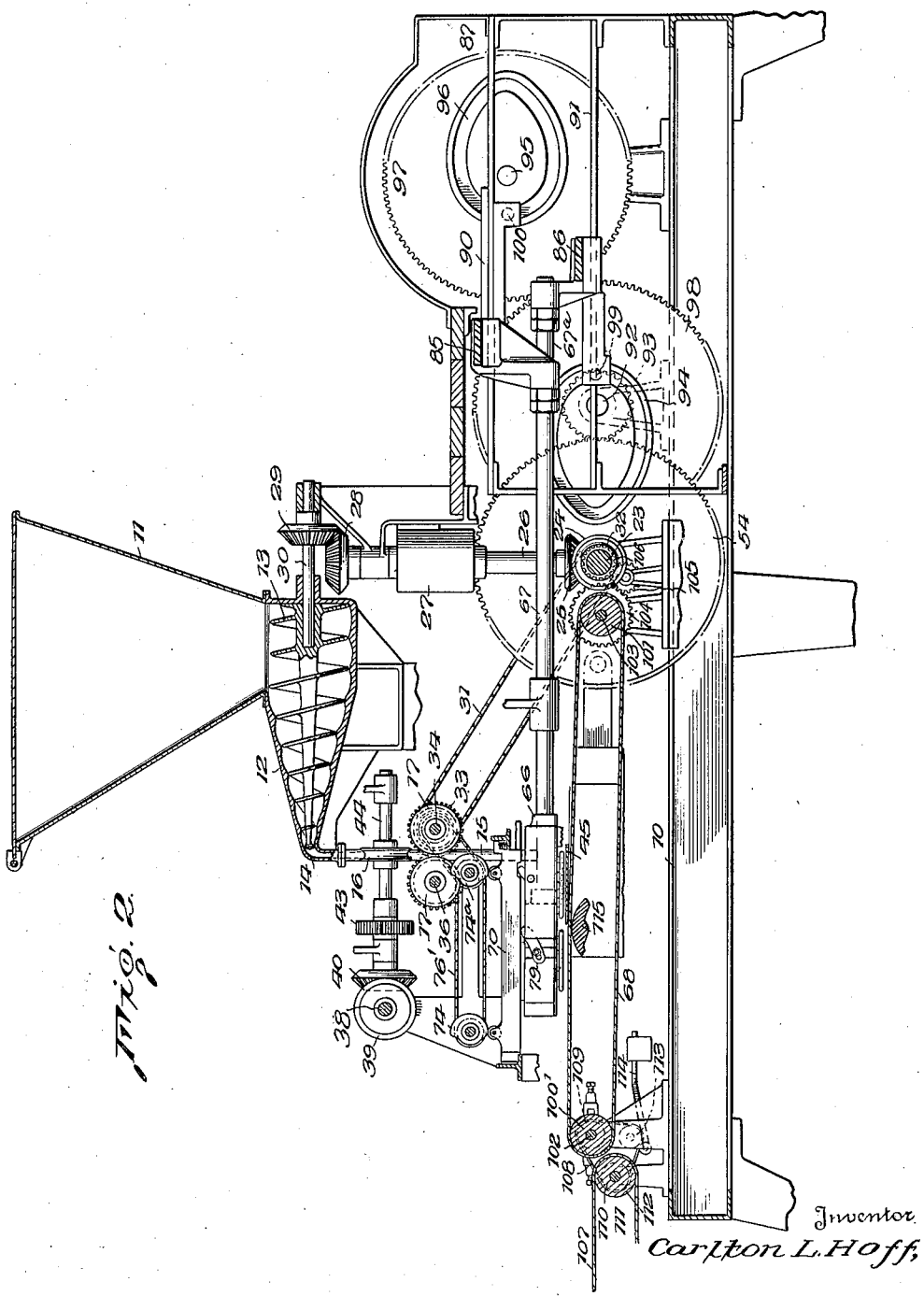

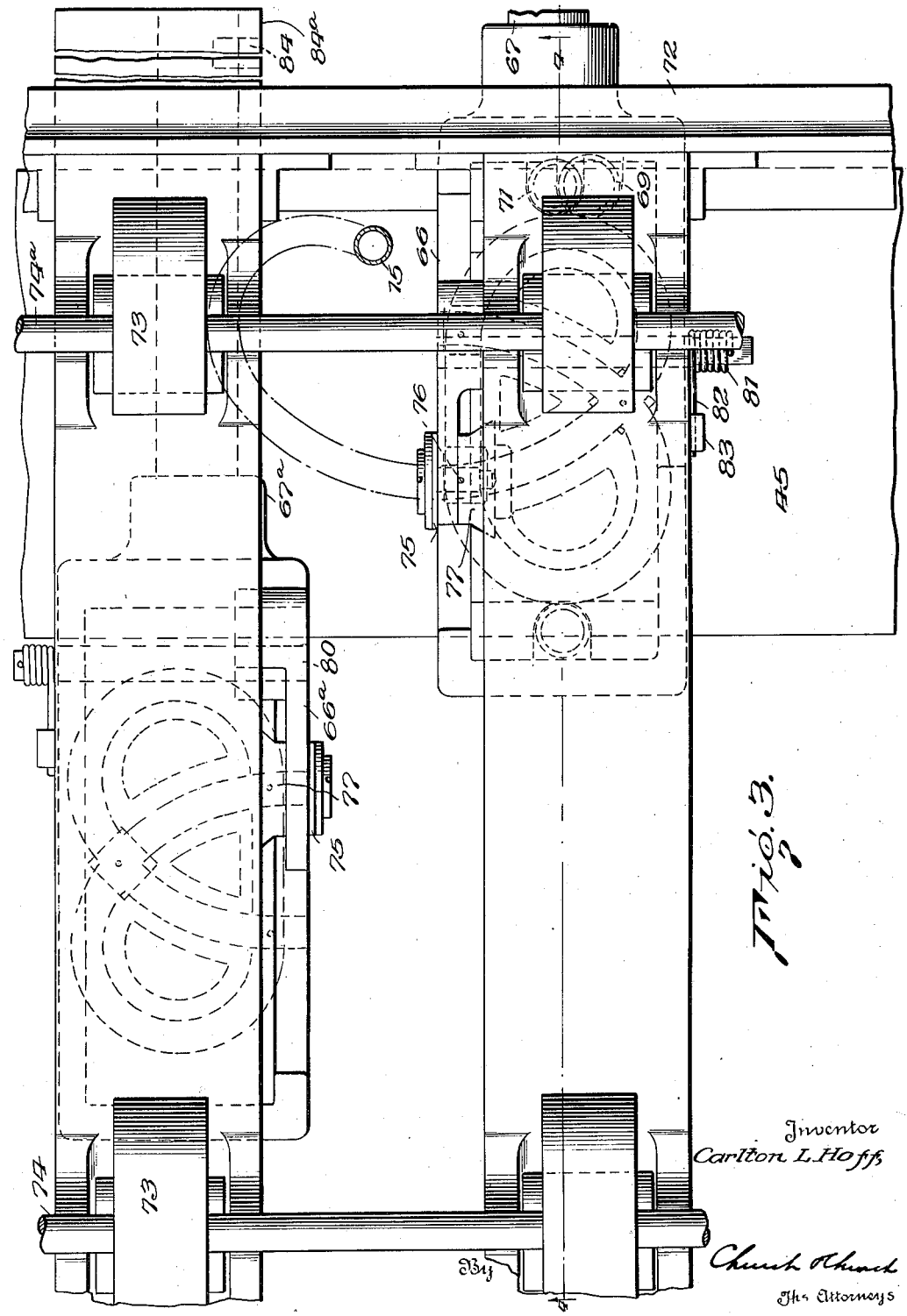

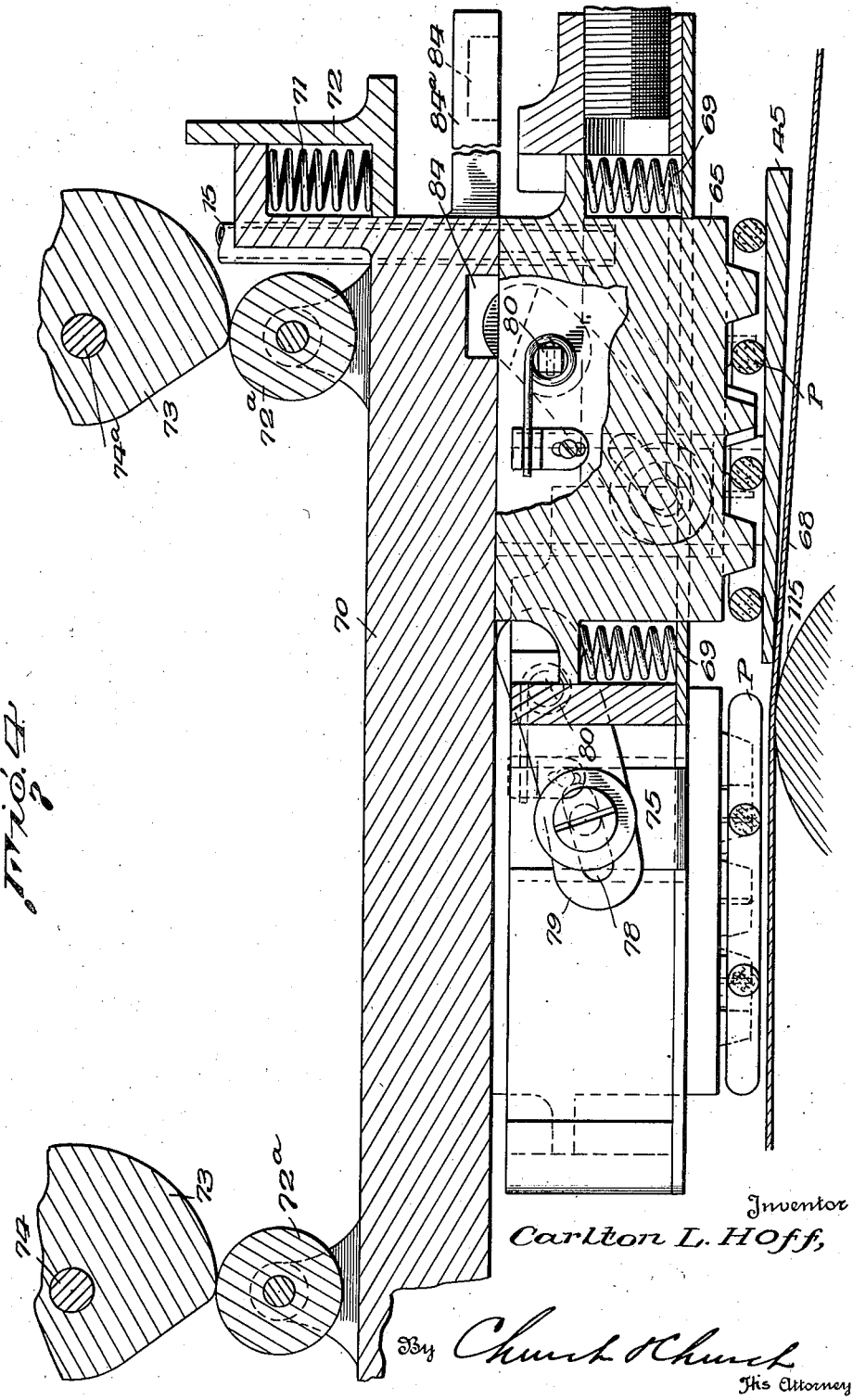

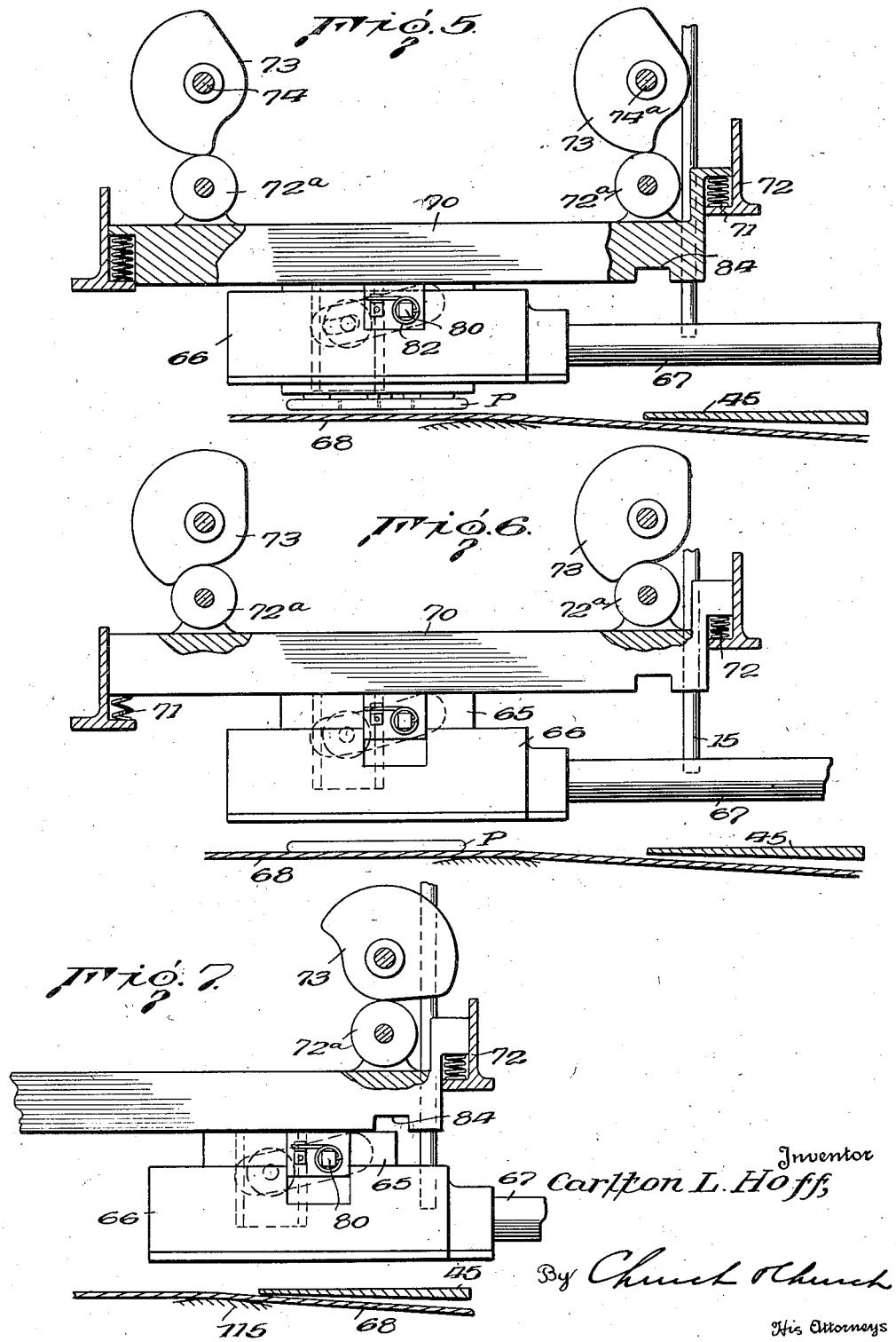

Jan. 19, 1937.  C. L. HOFF  2,068,234
MACHINE AND METHOD FOR MAKING PRETZELS
Filed April 4, 1933   7 Sheets-Sheet 7
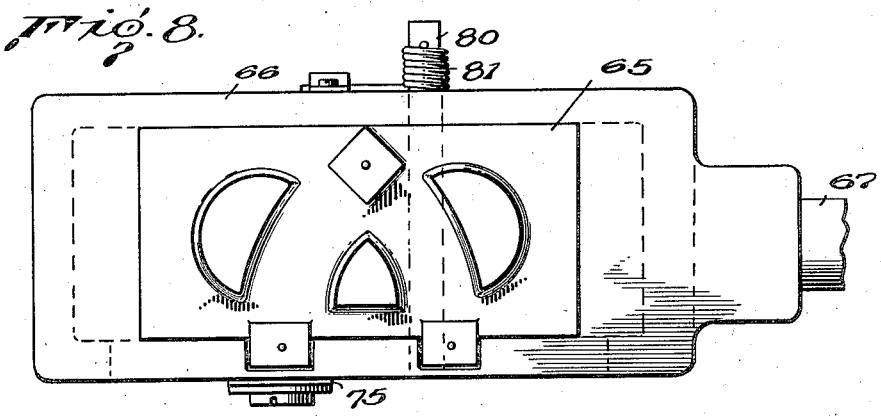
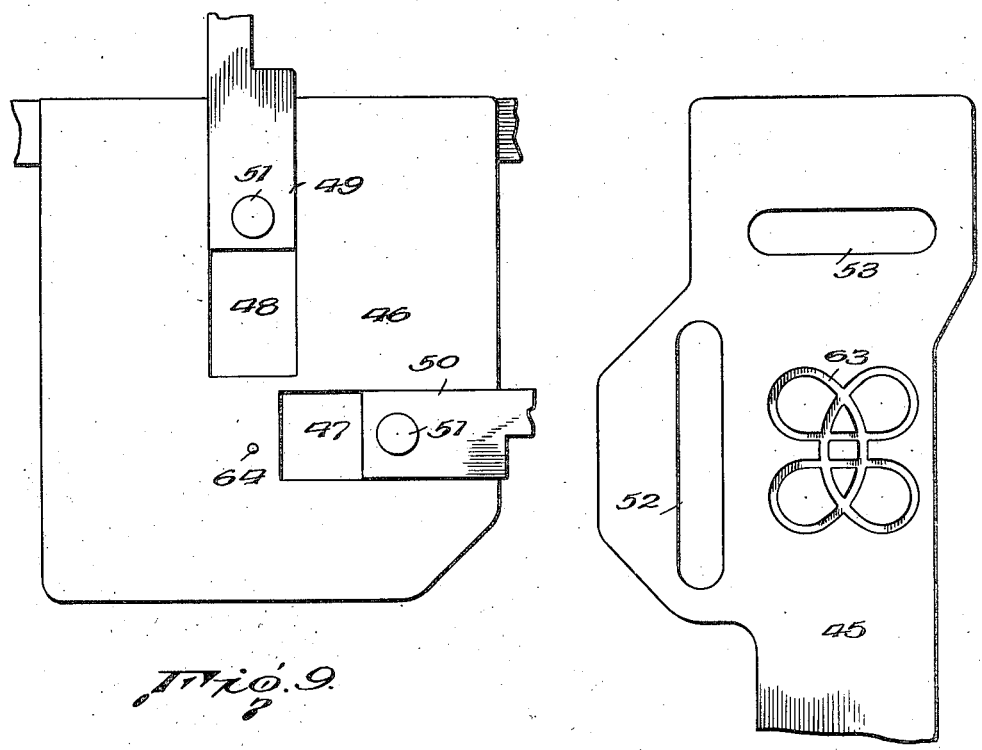
Inventor
Carlton L. Hoff,
By Church & Church
His Attorneys Patented Jan. 19, 1937

2,068,234

UNITED STATES PATENT OFFICE 2,068,234

MACHINE AND METHOD FOR MAKING PRETZELS

Carlton L. Hoff, York, Pa., assignor to National Biscuit Company, New York, N. Y., a corporation of New Jersey Application April 4, 1933, Serial No. 664,429

25 Claims. (Cl. 107—8)

This invention relates to machines for forming objects from plastic material, and particularly to a machine and method for forming pretzels from a string or strip of dough which preferably is laid on a forming surface in a continuous recurrent series of loops which are cut off from the strip to provide looped dough pretzels and removed from the surface for cooking and baking.

The general practice today, in the commercial production of pretzels, comprises the steps of forming the dough in strip or string formation; severing the strip mechanically into suitable lengths; and then manually forming these individual lengths of dough into the desired shape of the pretzel. The primary object of the present invention, therefore, is to eliminate all manual labor in the formation or shaping of the pretzel. That is, the present invention contemplates a machine wherein the dough is fed from a hopper to a mechanical forming device by which the pretzel dough is laid on a forming surface in over-lapping loops in the form of a looped pretzel and transferred mechanically from said forming surface to a conveyor on which it is carried to the desired point for subsequent handling.

Another object is to provide forming mechanism by which a continuous string or strip of dough is laid upon a forming surface in a path or outline corresponding to a plurality of pretzels which are automatically severed from one another as they are successively formed, whereby they may be individually removed from the forming surface and transferred to the conveyor heretofore mentioned.

More specifically, the invention contemplates a fixed feeding nozzle to which dough from the hopper is fed continuously and a forming plate movable relatively to said nozzle, the path of movement of any particular point on the plate surface corresponding to the outline or shape of the pretzel to be formed, whereby the strip of dough fed from the nozzle on to the plate will be deposited on the plate in the shape of the finished pretzel.

A still further object consists in a means for feeding the dough from the hopper to the nozzle in such fashion that there will be no tendency on the part of the feeding mechanism to place the dough under such pressure as would be detrimental to the consistency and quality of the dough.

Another object consists in the inclusion in the dough feeding mechanism of means for imparting to the strip of dough a smooth cylindrical surface and for slightly kneading the dough as it passes to and through the nozzle.

Another object contemplated consists in moving the forming plate relatively to the feeding nozzle at a speed slightly less than the rate of speed with which the dough is fed on to the plate so as to prevent any pulling of the dough by the plate which would tend to distort the shape of the pretzel being formed.

With these and other objects in view, the invention consists in certain details of construction and combinations and arrangements of parts, all of which will hereinafter be more fully described and the novel features thereof particularly pointed out in the appended claims.

In the accompanying drawings,

Figures 1 and 1a jointly represent a top plan view of the present machine with the intermediate portion of the machine, the hopper, and the major portion of the dough feeding mechanism omitted;

Fig. 2 is an elevational view, partly in section, taken transversely of the machine on the line 2—2 of Fig. 1;

Fig. 3 is a top plan view of the transfer devices for removing from the forming plate the pretzels formed thereon from one of the dough feeding nozzles;

Fig. 4 is a sectional view on the line 4—4 of Fig. 3;

Fig. 5 is a detail elevational view, partly in section, illustrating one of the transfer devices in the position in which it has transferred a pretzel from the forming plate on to the endless conveyor, the position of the transfer device being such that the pretzel has not been released therefrom;

Fig. 6 is a similar view showing the transfer device of Fig. 5 still advanced but the pretzel released;

Fig. 7 is a similar view showing the transfer device partially retracted;

Fig. 8 is a plan view of the bottom or pretzel-engaging face of one of the transfer devices;

Fig. 9 is a detail plan view of one of the end plates on which the forming plate is movably mounted;

Fig. 10 is a bottom plan view of one end of the forming plate;

Fig. 11 is a detail sectional view on the line 11—11 of Fig. 1; and

Fig. 12 is a detail sectional view on the line 12—12 of Fig. 1.

As heretofore stated, the present machine may be utilized in the formation of various articles from plastic materials, but it has been especially designed for the formation of pretzels formed from two or more overlapping loops of dough, as distinguished from cut or stamped pretzels and pretzel sticks. Also, for convenience in describing the construction and mode of operation of the machine, reference will be had to a single unit for feeding a strip of dough on to the forming surface and discharging the pretzels formed therefrom from the machine, but, as illustrated, the units or nozzles and associated mechanisms therefor, may be duplicated to any number desired. As illustrated in Figs. 1, 1a and 2, the various instrumentalities are supported on a frame 10. Above the frame 10 there is a hopper 11 for the dough or other material being handled and below the hopper there is a housing 12 in which is rotatably mounted a spiral feeding screw 13. This screw is tapered toward one end and the tapered end is adapted to feed the dough into the upper end of a tube 14, which terminates at its lower end in what will be termed the nozzle 15. The feed screw 13 is tapered, so as to more readily flow the dough and avoid any pressure such as would be detrimental to the consistency and quality of the dough. Intermediate the upper and lower ends of the tube constituting the nozzle, the walls of the tube are cut away, the openings thus formed being closed by rotatable rollers arranged in pairs at diametrically opposite sides of the tube, as illustrated at 16, 16, and 17, 17. These rollers 16, 17, are grooved so as to conform to the cylindrical shape of the tube, and by rotating said rollers at a speed somewhat in excess of what would otherwise be the normal flow of the dough through the tube, the frictional engagement of the dough with the peripheries of said rollers assists in the flow of the dough and also has a tendency to slightly knead the dough. The various moving parts of the machine are actuated by power derived from some suitable source and transmitted through reduction gearing 18 to a shaft 19 carrying bevel gears 20 and 21. Gear 21 meshes with a bevel gear 22 on what might be termed the main drive shaft 23 of the machine. For each unit in the machine, shaft 23 carries a bevel gear 24 with which meshes a bevel gear 25 on an upright sectional shaft 26, whose sections are connected by a variable speed mechanism 27. At its upper end, shaft 26 has a beveled gear 28 which meshes with a bevel gear 29 on the shaft 30 of the feed screw 13. Rollers 17, 17, are driven by a sprocket chain 31 from a sprocket 32 on shaft 23, said sprocket chain passing over a sprocket 33 on the shaft 34 on which one of said rollers 17 is mounted. Shaft 34 carries a gear 35, which meshes with a gear 35a on shaft 36 on which the other roller 17 is mounted. Gear 20 on shaft 19 (Fig. 1) meshes with bevel gear 37 on a shaft 38 and for each unit of the machine, shaft 38 has a bevel gear 39, meshing with another gear 40 on a shaft 41 on which one of the rollers 16 is mounted. Shaft 41 carries a gear 42 meshing with a gear 43 on a shaft 44 on which the other roller 16 is mounted.

The dough is fed from the nozzle 15 in the form of a continuous strip or ribbon and deposited in its ribbon-like form upon a suitable forming surface which may be in the form of plate 45, one of these elements being movable relatively to the other in such fashion that the strip is caused to assume the shape or outline of one or more pretzels. In the present instance, the forming plate 45 is moved relatively to the nozzle so that the strip of dough is laid in a continuous path or orbit having a number of overlapping loops, one cycle of which corresponds to the outline or shape of two pretzels, each pretzel, as shown in the drawings, consists of two overlapping loops, but the pretzels may comprise one or more loops of any desired shape, size or contour. The forming plate is mounted and actuated as follows. At each end of the frame 10, there is a supporting plate 46 and in each plate 46 there are two guideways 47, 48, the guideways 47 extending longitudinally of the forming plate 45, and the ways 48 extending laterally of said plate. Slidable in ways 48, are rods 50, and slidable in ways 47 are rods 49. Each rod 49, 50, carries an upwardly projecting pin 51, the pins on rods 49 engaging in longitudinally extending slots 52 in the forming plate 45, and the pins 51, on rods 50, projecting into transverse slots 53 in said forming plate. Mounted on shaft 23 are a pair of gears 54, each of which has in one side face thereof a box cam 55, in which rollers 56 on the ends of rods 49, engage. Shaft 23, at the end opposite bevel gear 22 is also provided with a bevel gear 22a, which meshes with a similar gear 57 on a shaft 58 mounted in bearings 59. Said shaft 58 and the main drive shaft 19 carry cam wheels 60, each of which has formed in one face thereof a box cam 61, in which cam rollers 62 on the ends of rods 50 engage. Box cams 55 and 61 are so formed that the longitudinal and lateral movements imparted to the forming plate will, jointly, result in that plate being moved so that any particular point thereon will travel in an endless path corresponding to the outline of two pretzels. To aid, or rather, to further control this peculiar movement of the plate, the under surface of the plate, at each end of the latter, is formed with a camway 63 in which guide pins 64 on the supporting plates 46 engage. This camway 63 accurately defines the path in which any particular point on the plate 45 moves with respect to the nozzle 15.

As the dough issues in a continuous strip from the nozzle and, as said strip of dough is deposited on plate 45, in a continuous or unbroken path, it is necessary to provide means for severing the individual pretzels as they are successively formed in order that they may be separately discharged from the machine. Preferably, these means for severing the strip of dough to separate the individual pretzels consist of cutting blades preferably carried on the transfer devices which remove the pretzels from the forming plate. Referring particularly to Figs. 1 and 3 to 8, the transfer devices, of which there are two for each nozzle, consist of transfer blocks 65, 65a, vertically slidable in yokes 66, 66a said yokes being mounted on push rods 67, 67a, connected to operating mechanism hereinafter described whereby the yokes, together with the blocks, will be reciprocated laterally of the forming plate. The reciprocatory motion of the yoke carries the block therein from a point above the forming plate to a point above the endless traveling conveyor 68. The blocks 65, 65a, are adapted to be depressed in their respective yokes at a predetermined time when the yoke is positioned over the forming plate, whereby the block, whose under face is formed or recessed to accommodate a pretzel, will be moved downwardly over a pretzel on said plate, and then, when the yoke is advanced to the position over the endless conveyor 68, the block will slide the pretzel off of the forming plate on to said belt. After reaching the position over the belt 68, the transfer block is again released, whereby it is permitted to be elevated and disengaged from the pretzel which will then be carried away by the conveyor 68. The blocks 65, 65a, are yieldingly held elevated in their respective yokes by springs 69, and to depress the blocks in the yokes, each transfer device has positioned above it a plate 70 yieldingly held elevated by springs 71 in frame member 72. Each plate 70 carries cam rollers 72a operatively associated with cam members 73 on shafts 74, 74a, and mounted on said shafts 74, 74a, are sprocket wheels connected by a sprocket chain 76'. Shaft 74a also carries a sprocket 77' connected by a sprocket chain 78' to a sprocket 79' on shaft 34, whereby motion is imparted to shafts 74, 74a from the main drive shaft 23. The peripheries of cams 73 are so shaped and the speed of rotation of said cams is so timed with respect to the reciprocatory motion of the yokes 66, 66a, that the plate 70 will be depressed when the yoke is in position over the forming plate and will remain depressed until the block in the yoke has moved a pretzel from the forming plate and positioned it on the endless conveyor 68. In Fig. 5, the yoke 66 is shown positioned over the belt 68 with the lower face of the transfer block still held in engagement with the pretzel P. In Fig. 6, the cams 73 are shown advanced to a position where the plate 70 has been raised by the springs 71 and the block 65 likewise moved to its elevated position by springs 69 in the yoke 66, thereby releasing the pretzel P to permit it to be carried away by the conveyor 68. In Fig. 7, the yoke 66 is shown partially retracted to its position over the forming plate 45. The specific means, in the present instance, for severing the strip of dough to separate the individual pretzels consists of a cutting blade 75 secured by a screw 76 to a guide block 77 slidably mounted in one side face of each transfer block 65, 65a. The screw 76 passes through a slot 78 in a link 79 fixedly mounted on a cross pin 80 journaled in and extending through the transfer block. Coiled around the projecting end of the pin 80 is a spring 81, one end of the spring being attached to the pin and the other end, indicated at 82, engaged against a lug 83 on the side of the yoke. The tendency of the spring is to turn the pin in a direction which will depress the guide block 77 and cutting blade 75, but depression of the said block and blade is prevented until the desired moment by the pivoted end of the link 79 engaging against the under face of plate 70. However, at the moment the cutting blade should be depressed for the purpose of severing the strip of dough, the pivoted end of the link 79 is adapted to move into registry with a recess 84 in the bottom face of plate 70, whereby the pivoted end of the link being free to move upward, the other end, or the end connected to screw 76 will be moved downwardly and depress the cutting knife 75.

As heretofore stated, the dough issuing from any one nozzle is laid into a continuous path corresponding to the shape of two pretzels and there are two transfer devices for each nozzle. For convenience, these will be called the right and left hand pretzels, which are formed in each cycle of operation each pretzel consisting of two loops of dough which over-lap in part. A pair of transfer devices is shown in Fig. 3, in which figure one transfer device is advanced and the other is positioned over the forming plate 45. In the position occupied by this latter transfer block, the knife 75 has just been depressed to sever the pretzel that has just been formed, it being understood that that particular pretzel is at the moment received in the recessed under face of the transfer block. In this figure, it will be noted that a considerable length of dough, which will form the next succeeding pretzel, has been deposited upon the forming plate, as is indicated by the dot and dash line. The timing of the mechanism is arranged in this fashion, in order that, at the time one pretzel is severed, there will be a sufficient quantity of dough forming the next pretzel on the plate to eliminate the possibility of the shape of the succeeding pretzel being deformed by any pulling tendency on the part of the forming plate. It will also be noted in this figure that the cutting blade of one block is at the forward end thereof, so as to sever one of the cross-over stretches of dough, while the blade on the other block is adjacent the rear end of the block, so that it will cut the other cross-over portion of dough. Also, as illustrated in Figs. 3 and 4, it will be noted that the recess 84 for permitting depression of the cutting blade on one block is formed in an extension 84a on the plate 70. This is required, because it will be remembered that the forming plate moves laterally, as well as longitudinally and one of the transfer blocks must pick up its pretzel at a time when the plate is advanced, while the other block must pick up its pretzel at the time the plate is retracted. By the same token, it is necessary that one yoke and its block be reciprocated or retracted a greater distance than the other yoke and its block. This is taken care of by the reciprocating mechanism which will now be described.

Referring to Figs. 1 and 2, the push rods 67 of transfer yokes 66 are attached to a cross bar 85 and push rods 67a for transfer yokes 66a are attached to a cross bar 86. Cross bar 85 is slidably supported on ways 87, pins 88 on said ways extending through slots 89 in lateral extensions 90 formed integral with the cross bar. Cross bar 86 is slidably supported on ways 91. Journaled at each end of the main frame 10 is a stub shaft 92 carrying a gear 93 and a box cam 94. Gears 93 mesh with gears 54 on the main drive shaft 23. Also journaled in the ends of the main frame 10 is an elongated shaft 95 on which two box cams 96 and two gears 97 are mounted, said gears meshing with gears 98 on stub shafts 92 whereby motion is transmitted to shaft 95 from the main drive shaft. The cross bar 86 carries cam rollers 99 and bar 90 carries cam rollers 100, the rollers being operatively associated with box cams 94 and rollers 100 with box cams 96. The eccentricities of box cams 94 and 96 are such that when the left-hand pretzel or pretzels have been formed and the forming plate 45 moved to a point where the right-hand pretzel or pretzels are formed to the extent illustrated in Fig. 3, the cross bar 85 will be retracted so as to position the transfer block or blocks 65 over said left-hand pretzels. At this time, the cross bar 86 is advanced, but after a further one-half cycle of operations, during which time transfer blocks 65 would be advanced to slide the left-hand pretzel or pretzels off of plate 45, said bar 86 would be retracted to move the transfer blocks 65a over the then formed right-hand pretzel or pretzels. The next half cycle of operations would then advance bar 86 and blocks 65a to slide said right-hand pretzels off of plate 45.

The conveyor 68 may run on rollers 100, 101, mounted on shafts 102, 103, the latter also carrying gears 104 meshing with pinions 105 in mesh with gears 106 on the main drive shaft 23. The upper reach of conveyor 68 may be provided intermediate rollers 100, 101, with a support 115, if desired. At the discharge end of conveyor 68, the pretzels are transferred to a second conveyor 107. Motion is imparted to belt 107 by a drive belt 108 which runs on rollers 109 on shaft 102 and rollers 110 on shaft 111, the latter shaft having a roller 112 thereon on which one end of conveyor 107 is supported. Drive belt 108 also runs on a third roller 113 and said belt may be kept under proper tension by a weighted lever 114, as shown in Fig. 2.

With the various instrumentalities in the positions illustrated in Figs. 2 and 3, the cycle of operations of the machine consists generally of the following movements. Box cam 96 is rotated to advance plungers 67, yokes 66 and transfer blocks 65, the latter having been depressed by cams 74, 74a whereby it will have engaged the then formed right-hand pretzel and slide the pretzel off of forming plate 45 on to conveyor 68. It will be understood that at the time block 65 is depressed the upper end of link 79 attached to the knife guide block will have moved into registry with recess 84 in plate 70 and effected depression of knife 75 and the consequent severance of the strip of dough. During the transfer of the right-hand pretzel from the forming plate, said plate will be moved relatively to nozzle 15 so as to form the left-hand pretzel. Also, during the advance of blocks 65, cam 94 will have retracted plungers 67a, yokes 66a, and transfer blocks 65 so that, when the initial portion of the next right-hand pretzel has been formed, blocks 65a will be depressed by its superposed cam actuated plate 70 to grasp the left-hand pretzel. At the same time, knife 75 on block 65a will also be actuated to sever the dough so that, upon continued rotation of cam 94, the left-hand pretzel will be free and will be slid off of the forming plate on to conveyor 68 and release it when the block is released by plate 70 being released by cams 74, 74a. During this transfer of the left-hand pretzel, the next right-hand pretzel will be formed; transfer block 65 will have released the pretzel previously transferred by it and will be retracted to its first described position.

What I claim is:

1. In a machine of the class described, the combination of a forming surface, means for depositing a strip of plastic material continuously on said surface, means for moving said surface relatively to said depositing means in an orbital path corresponding to the shape of the finished article, and means for severing said strip to detach successively formed articles from each other.

2. In a machine of the class described, the combination of a forming plate, means for depositing a continuous strip of plastic material on said plate, said plate being movable relatively to said depositing means whereby the material is deposited on said plate in an endless path corresponding to the contour of a plurality of the finished articles to be produced, and means for severing said ribbon to detach each article from the others, said plate being moved at a rate of speed less than the rate of speed with which the material moves in being deposited on said plate.

3. In a pretzel forming machine, the combination of a plate, means for depositing a continuous strip of dough on said plate, means for moving the dough receiving portion of the plate relatively to said depositing means in a path corresponding to the outline of two juxtaposed pretzels, means for severing the dough to detach one pretzel from the other, and means for removing individual pretzels from the plate.

4. In a pretzel forming machine, the combination of a surface, feeding means comprising a nozzle for depositing a continuous strip of dough on said surface, means for effecting a relative movement of said surface and feeding means, the path of the moving element being a closed orbit comprising series of over-lapping loops corresponding to the outline of two pretzels, and means for severing one pretzel from the other.

5. In a pretzel forming machine, a surface, means for continuously depositing a strip of dough on said surface and forming said strip into juxtaposed pretzels, and means for intermittently severing the strip of dough to detach juxtaposed pretzels, and means for individually transferring successively formed pretzels from the surface, said severing means being carried by said transfer means.

6. In a machine of the character described, a forming plate, a hopper for a plastic material, a nozzle for depositing said material on said plate, a plurality of rotatable transversely curved surfaces jointly forming a circular opening through which the plastic material passes during its movement to and through said nozzle to form a continuous strip of material, means for causing relative movement of the plate and nozzle in a closed path having a plurality of over-lapping loops, and means for severing said strip periodically and removing the formed loops of material.

7. In a machine of the character described, the combination of a hopper for a plastic material, a plate on which material from said hopper is deposited in ribbon-like form, a pair of camways, a cam in each way connected to said plate, one of said cams being movable longitudinally of the plate and the other laterally of said plate, the connections between said cams and plate permitting movement of the plate relatively to the cams in directions at right angles to the movement of the respective cams, a guide way in said plate conforming to the shape of the article to be produced from the plastic material, and a guide engaging in said guide way.

8. In a machine of the character described, the combination of a forming plate, means for depositing a continuous strip of plastic material on said plate in the outline of the article to be produced, means for thereafter severing said strip to detach the completely formed individual articles, and reciprocating transfer devices engageable with the individual articles for removing the latter from said plate.

9. In a machine of the character described, the combination of a forming plate, means for depositing a strip of plastic material on said plate, means for producing relative movement between said plate and depositing means for laying said strip on said plate in the form of the finished article, an endless traveling surface, and means for transferring the formed article from said plate to said surface.

10. In a machine of the character described, the combination of a forming plate, means for depositing a strip of plastic material on said plate in the form of the finished article, a traveling conveyor, and a reciprocatory transfer member having one face thereof recessed to accommodate the article and slide the same from said plate on to said conveyor.

11. In a machine of the character described, the combination of a forming plate, means for depositing a continuous strip of plastic material on said plate in the form of a plurality of finished articles, a traveling conveyor, reciprocatory transfer members each recessed in one face to accommodate one of said articles and slide the same from said plate on to said conveyor, and cutting devices carried by said transfer members for severing said strip of material to detach the individual articles.

12. In a machine of the class described, the combination of a forming plate, means for depositing a strip of plastic material on said plate in the form of a finished article, a traveling conveyor, a reciprocatory yoke, movable from a position over said plate to a position over said conveyor, and a depressible transfer block carried by said yoke, one face of said block being formed to accommodate the formed article on the plate and transfer the same on to said conveyor.

13. In a machine of the character described, the combination of a forming plate, means for depositing a strip of plastic material on said plate in the shape of a finished article, a traveling conveyor, a reciprocatory yoke movable from a position above said plate to a position above said conveyor, a transfer block in said yoke, one face of said block being formed to accommodate the said shape, and means for depressing said block in said yoke and into engagement with a shape on said plate, said depressing means being inoperative when the block is moved to position above said conveyor.

14. In a machine of the character described, the combination of a forming plate, means for depositing a continuous strip of plastic material on said plate in a multiplicity of similar connected shapes, a traveling conveyor, a plurality of blocks each having one face formed to receive one of said shapes, means for moving said blocks from a position above said plate to a position above said conveyor to transfer a shape from the plate to the conveyor, and means carried by said blocks for severing said strip of material and detaching the individual shapes.

15. In a machine of the character described, the combination of a forming plate, means for depositing a continuous strip of plastic material on said plate in a multiplicity of similar connected shapes, a traveling conveyor, a plurality of blocks each having one face formed to receive one of said shapes, cam actuated means for releasably depressing the blocks into engagement with the shapes on said plate, means for moving said blocks from a position above said plate to a position above said conveyor to transfer a shape from the plate to the conveyor, and means carried by said blocks for severing said strip of material and detaching the individual shapes.

16. In a pretzel forming machine, the combination of a receiving surface, a nozzle, means for delivering a continuous strip of dough from said nozzle to said surface, means for depositing said strip on said surface in successive series of overlapping loops, each series of loops forming a pretzel, and means for severing each formed pretzel during the formation of a following pretzel.

17. In a pretzel forming machine, the combination of a plate, a series of nozzles through each of which a strip of dough is fed continuously on to said plate, means for moving said plate relatively to said nozzles to successively form a plurality of connected pretzels from each strip, and means for severing complete successively formed pretzels from each strip during the formation of a following pretzel.

18. In a pretzel forming machine, the combination of a receiving plate, means for forming a continuous strip of plastic material, means for depositing said strip continuously on said plate, means for causing relative orbital movement between said plate and depositing means, said orbit lying in a plane at right angles to the direction of movement of said strip and comprising a plurality of connected closed figures, whereby said strip is deposited on said plate to form successive closed figures connected by said strip, means for severing the strip between a completely formed figure and a succeeding figure that is being formed, and means for removing the completely formed figure.

19. In a machine of the class described, the combination of a horizontal forming plate, means for depositing a continuous strip of plastic material thereon, means for causing continuous relative movement between said depositing means and said plate in a recurrent horizontal orbit, and means for removing the material deposited on said plate during one course of said orbit prior to completion of the next course.

20. The method of forming pretzels having closed loops which comprises forming the pretzel dough into a continuous strip of a cross section to form pretzels, depositing said strip in loops to form connected pretzels, severing the strip to detach each formed pretzel and removing the detached pretzel.

21. The method of forming pretzels having closed loops which comprises forming the pretzel dough into a continuous strip of a cross section to form pretzels, depositing said strip in loops to form a recurrent series of connected looped pretzels, successively severing the strip to detach each formed pretzel, and removing the detached pretzels to permit the formation of recurrent pretzels.

22. In a machine of the class described, the combination of a forming surface, means for depositing a strip of plastic material continuously on said surface, means for moving said surface and depositing means continuously relatively to each other in a path conforming to the outline of the finished article, whereby the strip of material will be deposited on the surface in the form of the finished article, and means for severing the strip and removing the completed article from the forming surface.

23. The method of forming articles having closed loops from plastic material which comprises, forming an endless strip of plastic material of a cross section to form the articles, feeding said strip in an endless flow in over-lapping loops about a central point in the form of a plurality of the articles, severing the strip and removing each formed article without interruption to the continuous flow of plastic material.

24. In a machine of the class described, the combination of a forming surface, a continuously operating depositing means for depositing a strip of plastic material on said surface, means for causing relative orbital travel between the forming surface and depositing means, and severing means operated intermittently in timed relation to said orbital travel means for periodically severing said strip.

25. In a machine of the class described, the combination of a receiving surface, means for depositing a strip of plastic material continuously on said surface, means for moving said surface and depositing means continuously relatively to each other in a path conforming to the outline of the finished article, whereby the strip of material will be deposited on the surface in innumerable similar finished articles, and means for intermittently severing the connected articles.

CARLTON L. HOFF.